(12) United States Patent
Trevino

(10) Patent No.: US 6,655,077 B1
(45) Date of Patent: Dec. 2, 2003

(54) TRAP FOR A MOUSE

(76) Inventor: Jose Trevino, 7556 Alameda Ave., El Paso, TX (US) 79915

( * ) Notice: Subject to any disclaimer, the term of this patent is extended or adjusted under 35 U.S.C. 154(b) by 0 days.

(21) Appl. No.: 10/197,961

(22) Filed: Jul. 17, 2002

(51) Int. Cl.[7] .............................................. A01M 23/30
(52) U.S. Cl. ........................................... 43/81; 43/81.5
(58) Field of Search ........................... 43/81, 81.5, 88, 43/92, 82, 83.5, 97, 58

(56) References Cited

U.S. PATENT DOCUMENTS

| | | | | |
|---|---|---|---|---|
| 1,167,493 A | * | 1/1916 | Grubbs | 43/81 |
| 1,223,271 A | * | 4/1917 | Grubbs | 43/81 |
| 1,623,841 A | * | 4/1927 | King | 43/81 |
| 1,799,323 A | * | 4/1931 | Ross et al. | 43/81 |
| 2,188,297 A | * | 1/1940 | Graybill | 43/81 |
| 2,216,529 A | * | 10/1940 | Brzykcy | 43/81 |
| 2,231,984 A | * | 2/1941 | Anderson | 43/81 |
| 2,581,628 A | * | 1/1952 | Burwell | 43/81 |
| 2,616,211 A | * | 11/1952 | Johnson | 43/81 |
| 3,968,589 A | * | 7/1976 | Basham | 43/81 |
| 4,071,972 A | * | 2/1978 | Conibear | 43/92 |
| 4,245,423 A | | 1/1981 | Souza et al. | |
| 4,574,519 A | | 3/1986 | Eckebrecht | |
| 4,592,162 A | * | 6/1986 | Hallback | 43/81 |
| 4,711,049 A | | 12/1987 | Kness | |
| 5,001,857 A | * | 3/1991 | McDaniel et al. | 43/81 |
| 5,148,624 A | | 9/1992 | Schmidt | |
| 6,119,391 A | | 9/2000 | Maconga | |
| 6,137,415 A | * | 10/2000 | Rast | 43/81 |
| 6,199,314 B1 | | 3/2001 | Ballard | |
| 6,282,832 B1 | | 9/2001 | Manno | |

FOREIGN PATENT DOCUMENTS

GB     2209113 A  *  5/1989  .......... A01M/23/24

* cited by examiner

Primary Examiner—Peter M. Poon
Assistant Examiner—Joan M. Olszewski
(74) Attorney, Agent, or Firm—Richard L. Miller

(57) ABSTRACT

An improved trap for a mouse of the type having a baseboard, a U-shaped jaw member that is pivotally mounted on the baseboard for pivotal movement from a cocked position to a sprung position, a bait pedal that is attached to the baseboard, and a trigger mechanism that has a longitudinal axis and which is operatively attached to the bait pedal and when the U-shaped jaw member is in the cocked position thereof the trigger mechanism is operatively connected to the U-shaped jaw member. The improvement includes the trigger mechanism allowing the U-shaped jaw member to achieve the sprung position thereof only when the trigger mechanism is rotated about the longitudinal axis thereof.

7 Claims, 1 Drawing Sheet

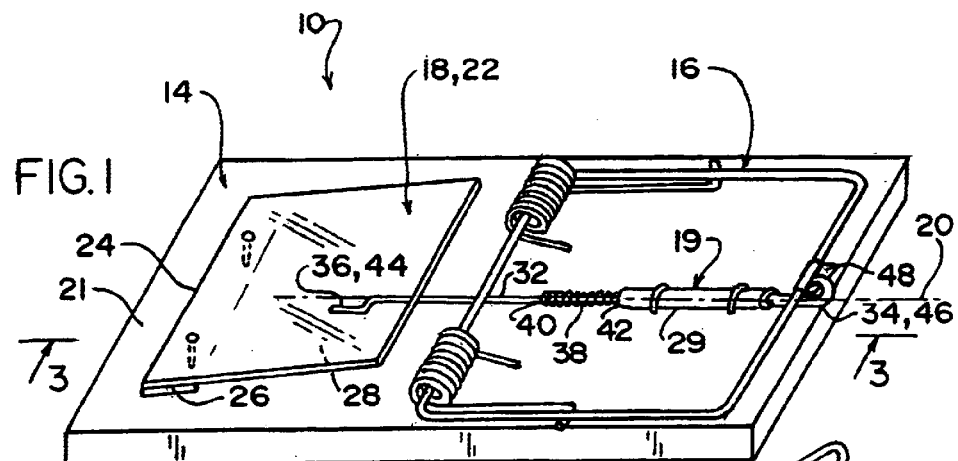
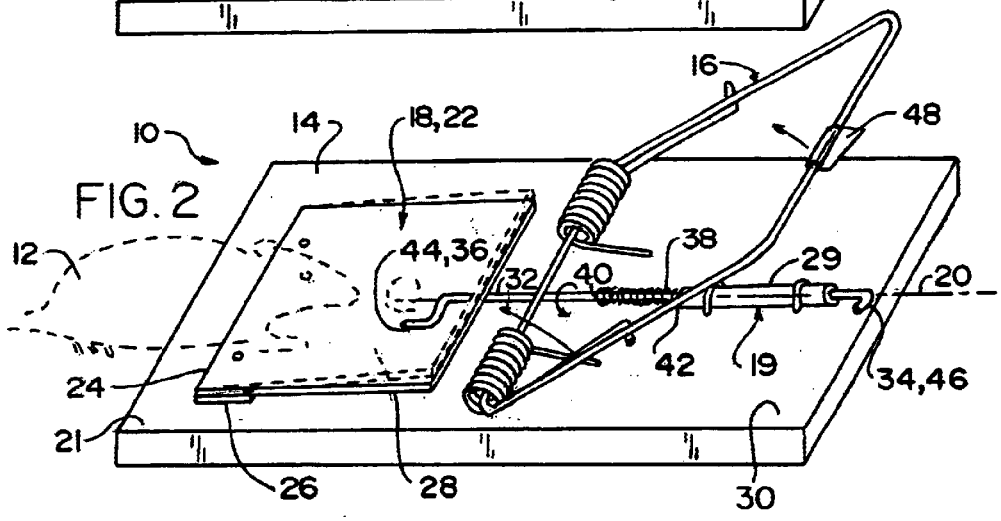
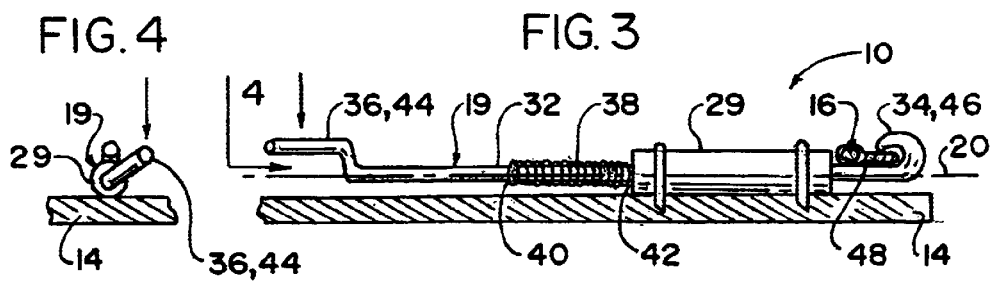

TRAP FOR A MOUSE

BACKGROUND OF THE INVENTION

1. Field of the Invention

The present invention relates to a trap. More particularly, the present invention relates to a trap for a mouse.

2. Description of the Prior Art

Numerous innovations for mouse traps have been provided in the prior art that will be described. Even though these innovations may be suitable for the specific individual purposes to which they address, however, they differ from the present invention.

A FIRST EXAMPLE, U.S. Pat. No. 4,245,423 to Souza et al. teaches a conventional form of mouse trap having a U-shaped sprung jaw pivotally mounted on a baseboard is provided with a novel form of pivotal bait pedal forming part of the trigger mechanism of the trap. The bait pedal molded in plastic, has a snap-on mounting arrangement for pivotally attaching same of the baseboard and has a system whereby the sensitivity of the trigger mechanism can be adjusted. Preferably the pedal has a size and shape to cover substantially the entire area enclosed by the trap jaw.

A SECOND EXAMPLE, U.S. Pat. No. 4,574,519 to Eckebrecht teaches a novel mouse trap. The trap includes a base, a sensing platform having a forward end and a rearward extension and pivotable as a first class lever about an intermediate fulcrum. A spring loaded garrot wire is movable between a spring-load position extending rearwardly of the base and a spring-released, tripped position extending forwardly of the base, holding means for holding the garrot wire in its spring-loaded position and trip bar means for releasing the holding means to allow the garrot wire to move to the spring-released, tripped position. The essence of the invention resides in the provision of a combined holding member and trip bar, of a particular specified shape and having one essential element extending rearwardly from the sensing platform and lying beneath the garrot wire when the garrot wire is in the spring-loaded position. The linkage is pivotal about a fulcrum, and is held to the garrot wire by the holding member. The site of the holding of the garrot wire by the holding member must be outboard of that fulcrum.

A THIRD EXAMPLE, U.S. Pat. No. 4,711,049 to Kness teaches an animal trap that comprises a base frame having an upper surface and a jaw member pivotally mounted on the base for pivotal movement from a cocked position to a sprung position, the jaw member having at least one horizontal bar extending transversely of the base. Spring means yieldably urge the jaw member to the sprung position. A catch member is pivotally mounted on the frame also and includes a catch pawl for retentively engaging the bar of the jaw member to hold the bar in its cocked position. The catch member is pivotal away from retentive engagement with the bar to release the jaw member so that it can return to its original position. A trip member is also pivotally mounted on the base, and is movable to a set position engaging the catch member to hold the catch member against the bar when the bar is in its locked position. The trip member is movable to release the catch member which in turn releases the bar and permits the jaw member to pivot to its sprung position. The trip member is engaged by the jaw frame and urged to its release position whenever the jaw frame is in its sprung position. A small spring urges the trip member to its set position at all other times.

A FOURTH EXAMPLE, U.S. Pat. No. 5,148,624 to Schmidt teaches an improved mousetrap featuring a handle that is remote from the trapping mechanism so that the mousetrap may be set for use without endangering one's hands or fingers. The mousetrap includes a cover that serves a fourfold function of protecting humans from the trapping mechanism, shielding capturing animals from sight, defining a single deadly pathway for an animal to advance upon bait on the mousetrap, and providing decorative indicia. The handle protrudes from the cover which encloses a spring-biased jaw frame, trigger, and catch member of the mousetrap. The jaw frame is pivotally mounted to a base such that the jaw frame pivots between a cocked position, whereat the catch member retains the jaw frame in an orientation perpendicular to the base, and a shut position. Movement of the trigger by an animal causes the catch member to release the jaw frame so that the mousetrap snaps shut.

A FIFTH EXAMPLE, U.S. Pat. No. 6,119,391 to Maconga teaches a safety trap setting device for use in conjunction with a snap type trap having a selectively activated member. The safety trap setting device has a structure configured to accept at least a portion of the snap type trap therein and a mechanism for preventing the selectively activated member from becoming fully activated when at least a portion of the snap type trap is within the structure of the snap type trap.

A SIXTH EXAMPLE, U.S. Pat. No. 6,199,314 B1 to Ballard teaches a housing that includes a closed bottom, closed sides, an open receiving end and a closed rear end. The housing is adapted to receive a platform of a conventional mouse trap therein. A cocking handle includes a pair of handle arms attached to pivotal connections on the sides, and terminating at a cross-bar. A pair of bow urging arms are also attached to the pivotal connections. The bow urging arms have tabs at the distal ends thereof, which are adapted to be positioned beneath a bow of the mouse trap when the platform is slid into the housing of the cocking device. A safety latch is pivotally connected to the housing above the receiving end. By rotating the cocking handle, the bow urging arms urge the bow to a cocked position. The catch member is then pivoted inward to maintain the bow in the cocked position until the locking arm of the mouse trap is engaged in the bait pedal of the mouse trap.

It is apparent that numerous innovations for mouse traps have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a trap for a mouse that avoids the disadvantages of the prior art.

ANOTHER OBJECT of the present invention is to provide a trap for a mouse that is simple and inexpensive to manufacture.

STILL ANOTHER OBJECT of the present invention is to provide a trap for a mouse that is simple to use.

BRIEFLY STATED, STILL YET ANOTHER OBJECT of the present invention is to provide an improved trap for a mouse of the type having a baseboard, a U-shaped jaw member that is pivotally mounted on the baseboard for pivotal movement from a cocked position to a sprung position, a bait pedal that is attached to the baseboard, and a trigger mechanism that has a longitudinal axis and which is operatively attached to the bait pedal and when the U-shaped jaw member is in the cocked position thereof the trigger mechanism is operatively connected to the U-shaped jaw member. The improvement includes the trigger mechanism allowing the U-shaped jaw member to achieve the sprung position thereof only when the trigger mechanism is rotated about the longitudinal axis thereof.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the present invention in the cocked position;

FIG. 2 is a diagrammatic perspective view of the present invention in the uncocked position;

FIG. 3 is a diagrammatic cross sectional view taken along line 3—3 in FIG. 1; and FIG. 4 is a diagrammatic end elevational view taken generally in the direction of arrow 4 in FIG. 3.

LIST OF REFERENCE NUMERALS UTILIZED IN THE DRAWING 10 improved trap of present invention for mouse 12
12 mouse
14 baseboard
16 U-shaped jaw member
18 bait pedal
19 trigger mechanism
20 longitudinal axis of trigger mechanism 19
21 one end of baseboard 14
22 plate of bait pedal 18
24 end of plate 22
26 step of plate 22
28 space between baseboard 14 and remaining portion of plate 22
29 tube of trigger mechanism 19
30 other end of baseboard 14
32 rod of trigger mechanism 19
34 proximal end of rod 32 of trigger mechanism 19
36 distal end of rod 32 of trigger mechanism 19
38 coil spring of trigger mechanism 19
40 end of coil spring 38 of trigger mechanism 19
42 another end of coil spring 38 of trigger mechanism 19
44 crank of distal end 36 of rod 32 of trigger mechanism 19
46 hook of proximal end 34 of rod 32 of trigger mechanism 19
48 tab of trigger mechanism 19

DETAILED DESCRIPTION OF THE PREFERRED EMBODIMENT

Referring now to FIGS. 1–4, in which like numerals indicate like parts, the improved trap of the present invention is shown generally at 10 for a mouse 12.

The improved trap for a mouse is of the type having a baseboard 14, a U-shaped jaw member 16 that is pivotally mounted on the baseboard 14 for pivotal movement from a cocked position (see FIG. 1) to a sprung position (see FIG. 2), a bait pedal 18 that is attached to the baseboard 14, and a trigger mechanism 19 that has a longitudinal axis 20 and which is operatively attached to the bait pedal 18 and when the U-shaped jaw member 16 is in the cocked position thereof the trigger mechanism 19 is operatively connected to the U-shaped jaw member 16.

The improvement comprises the trigger mechanism 19 allowing the U-shaped jaw member 16 to achieve the sprung position thereof only when the trigger mechanism 19 is rotated about the longitudinal axis 20 thereof.

The improvement further comprises the bait pedal 18 being a plate 22.

The improvement further comprises the plate 22 being plastic.

The improvement further comprises the plate 22 having an end 24 that is furthest away from the trigger mechanism 19 and which is flexibly affixed to one end 21 of the baseboard 14.

The improvement further comprises the plate 22 having a step 26 that is disposed under the end 24 of the plate 22 so as to create a space 28 between the baseboard 14 and a remaining portion of the plate 22.

The improvement further comprises the trigger mechanism 19 having a tube 29 that is affixed longitudinally at the other end 30 of the baseboard 14.

The improvement further comprises the trigger mechanism 19 having a rod 32 that extends longitudinally movably and rotatably through the tube 29 and has a proximal end 34 that is disposed at the other end 30 of the baseboard 14 and a distal end 36 that is operatively connected in the space 28.

The improvement further comprises the trigger mechanism 19 having a coil spring 38 that receives the rod 32 and has an end 40 that is affixed to the rod 32 and another end 42 that sits against the tube 29 so as to bias the rod 32 away from the tube 29 towards the plate 22.

The improvement further comprises the distal end 36 of the rod 32 being a crank 44 that is both elevated upwardly at an acute angle relative to the baseboard 14 and has the plate 22 rest thereon when the U-shaped jaw member 16 is in the cocked position and is pivoted downwardly onto the baseboard 14 when the U-shaped jaw member 16 is in the sprung position.

The improvement further comprises the proximal end 34 of the rod 32 being a hook 46 that is elevated perpendicularly upwardly relative to the baseboard 14 when the U-shaped jaw member 16 is in the cocked position and is pivoted downwardly towards the baseboard 14 in a same direction as the crank 44 of the rod 32 when the U-shaped jaw member 16 is in the sprung position by virtue of the crank 44 being pivoted onto the baseboard 14 when the U-shaped jaw member 16 is in the sprung position.

The improvement further comprises the trigger mechanism 19 having a tab 48 that is affixed to the U-shaped jaw member 16 closest to the hook 46 of the rod 32 and which engages the hook 46 of the rod 32 when the U-shaped jaw member 16 is in the cocked position and is released from the hook 46 of the rod 32 when the U-shaped jaw member 16 is in the sprung position by virtue of the hook 46 of the rod 32 being pivoted towards the baseboard 14 when the U-shaped jaw member 16 is in the sprung position.

The improvement further comprises the tab 48 being inclined towards a direction of pivoting of the hook 46 of the rod 32 so as to allow the tab 48 to release from the hook 46 of the rod 32 when the hook 46 of the rod 32 is pivoted towards the baseboard 14.

It will be understood that each of the elements described above, or two or more together, may also find a useful application in other types of constructions differing from the types described above.

While the invention has been illustrated and described as embodied in a trap for a mouse, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An improved trap for a mouse of the type having a baseboard, a U-shaped jaw member that is pivotally mounted on the baseboard for pivotal movement from a cocked position to a sprung position, a bait pedal that is attached to the baseboard, and a trigger mechanism that has a longitudinal axis and which is operatively attached to the bait pedal and when the U-shaped jaw member is in the cocked position thereof the trigger mechanism is operatively connected to the U-shaped jaw member, said improvement comprising the trigger mechanism allowing the U-shaped jaw member to achieve the sprung position thereof only when the trigger mechanism is rotated about the longitudinal axis thereof, wherein the improvement further comprises the bait pedal being a plate, wherein the improvement further comprises the plate having an end that is furthest away from the trigger mechanism and which is flexibly affixed to one end of the baseboard, wherein the improvement further comprises the plate having a step that is disposed under the end of the plate so as to create a space between the baseboard and a remaining portion of the plate, wherein the improvement further comprises the trigger mechanism having a tube that is affixed longitudinally at the other end of the baseboard, wherein the improvement further comprises the trigger mechanism having a rod that extends longitudinally movably and rotatably through the tube and has a proximal end that is disposed at the other end of the baseboard and a distal end that is operatively connected in the space.

2. The improved trap as defined in claim 1, wherein the improvement further comprises the plate being plastic.

3. The improved trap as defined in claim 1, wherein the improvement further comprises the trigger mechanism having a coil spring that receives the rod and has an end that is affixed to the rod and another end that sits against the tube so as to bias the rod away from the tube towards the plate.

4. The improved trap as defined in claim 1, wherein the improvement further comprises the distal end of the rod being a crank that is both elevated upwardly at an acute angle relative to the baseboard and has the plate rest thereon when the U-shaped jaw member is in the cocked position and is pivoted downwardly onto the baseboard when the U-shaped jaw member is in the sprung position.

5. The improved trap as defined in claim 4, wherein the improvement further comprises the proximal end of the rod being a hook that is elevated perpendicularly upwardly relative to the baseboard when the U-shaped jaw member is in the cocked position and is pivoted downwardly towards the baseboard in a same direction as the crank of the rod when the U-shaped jaw member is in the sprung position by virtue of the crank being pivoted onto the baseboard when the U-shaped jaw member is in the sprung position.

6. The improved trap as defined in claim 5, wherein the improvement further comprises the trigger mechanism having a tab that is affixed to the U-shaped jaw member closest to the hook of the rod and which engages the hook of the rod when the U-shaped jaw member is in the cocked position thereof and is released from the hook of the rod when the U-shaped jaw member is in the sprung position thereof by virtue of the hook of the rod being pivoted towards the baseboard when the U-shaped jaw member is in the sprung position.

7. The improved trap as defined in claim 6, wherein the improvement further comprises the tab being inclined towards a direction of pivoting of the hook of the rod so as to allow the tab to release from the hook of the rod when the hook of the rod is pivoted towards the baseboard.

* * * * *